UNITED STATES PATENT OFFICE.

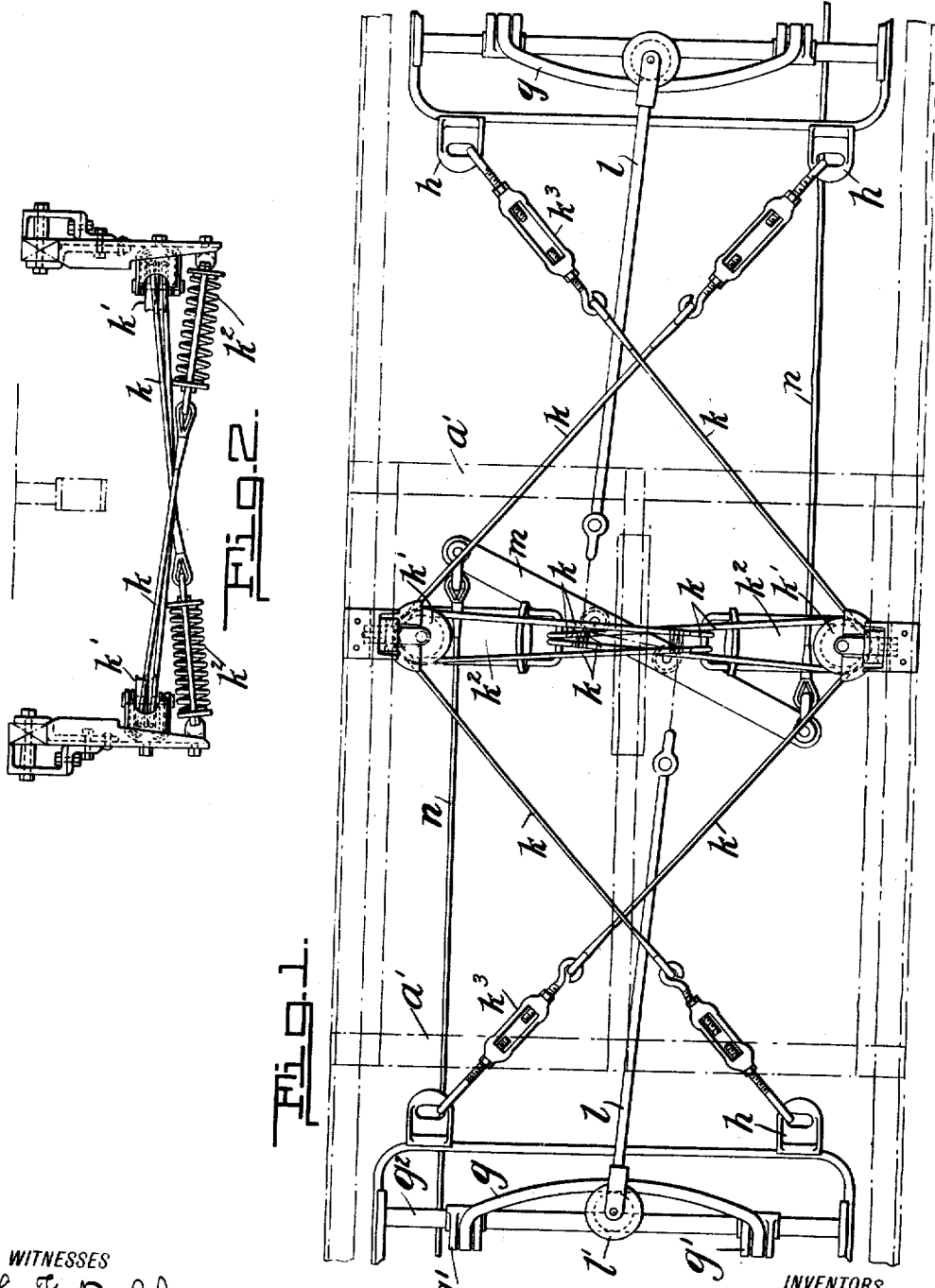

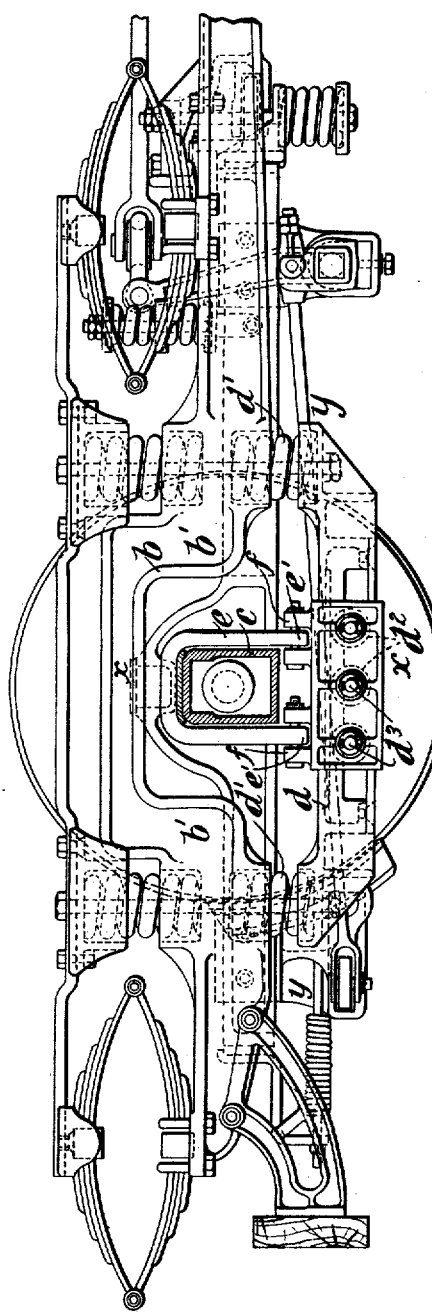
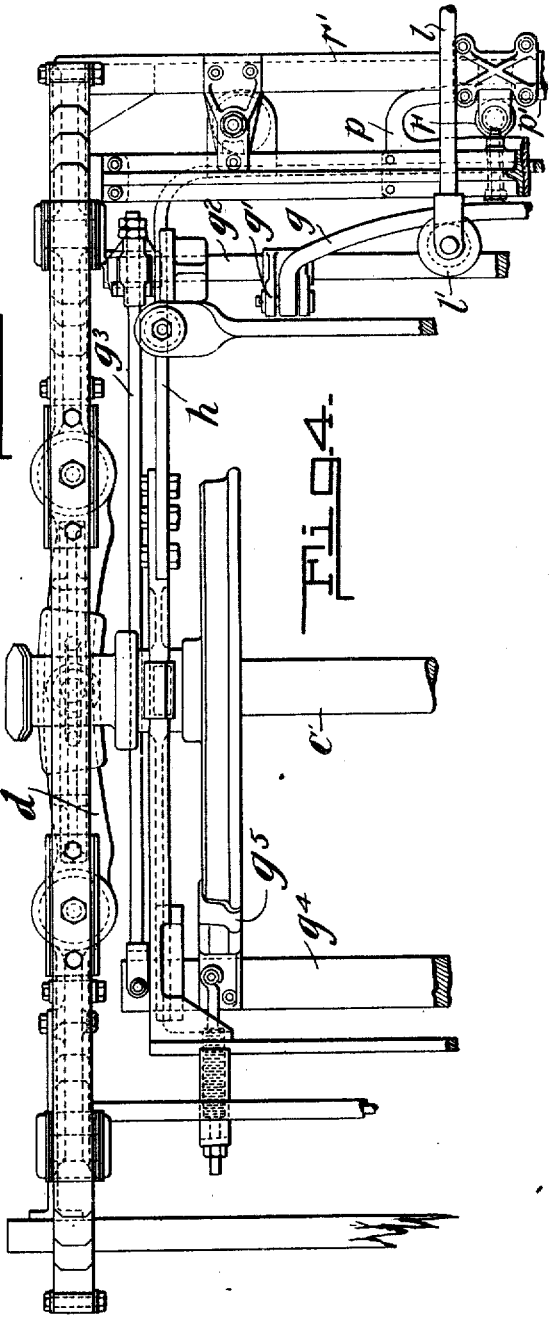

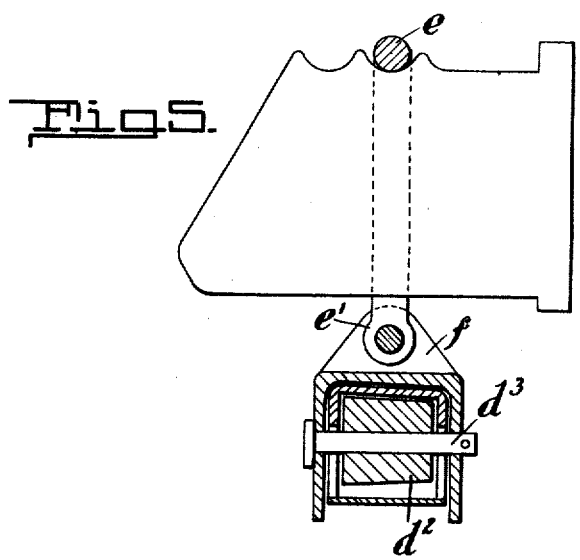
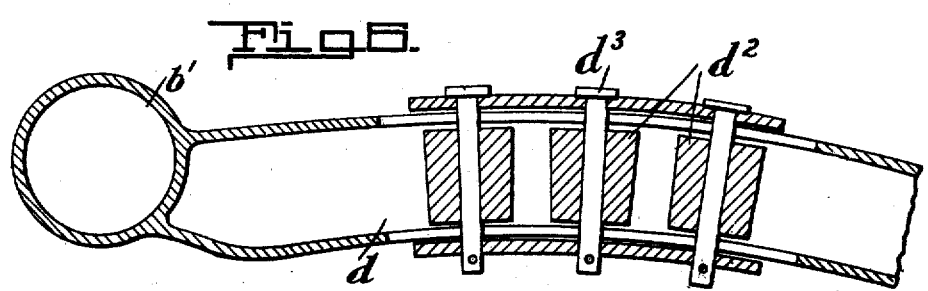

EDGAR PECKHAM AND SIDNEY THOMAS, OF LONDON, ENGLAND.

AXLE-TRUCK FOR RAILWAY, TRAMWAY, AND LIKE VEHICLES.

1,239,212.     Specification of Letters Patent.     Patented Sept. 4, 1917.

Application filed June 11, 1914, Serial No. 844,385. Renewed January 30, 1917. Serial No. 145,567.

*To all whom it may concern:*

Be it known that we, EDGAR PECKHAM and SIDNEY THOMAS, and the said EDGAR PECKHAM is a citizen of the United States of America, and the said SIDNEY THOMAS is a subject of the King of Great Britain, both residing at London, England, have invented new and useful Improvements in Axle-Trucks for Railway, Tramway, and like Vehicles, of which the following is a specification.

This invention relates to railway vehicles, and with respect to certain more specific features thereof, to undercarriage structures.

In this class of undercarriage structure arrangements have been proposed wherein each axle is provided with an axle frame or subtruck so connected at one end to springs attached to the main truck as to permit movement of the axle with the subtruck and wherein the main truck is suspended from the axle boxes in a manner to permit of independent movement of the axles relatively to the main truck, the sub-trucks constituting radial trucks, so called.

According to the present invention we employ in railway tramway or like vehicles of the kind specified, means whereby the axle frames or subtrucks are connected to springs supported by the car body or truck frame by connections which are such that an angular displacement of the leading subtruck stresses one or more of the springs, so that the trailing truck, upon reaching the curve, may make the required angular movement without having to stress said spring or springs. These springs form centering means for the trucks operating in both directions of movement of the car, and the compression of one of the springs by the turning of the leading truck at a curve releases the centering means so far as the trailing truck is concerned, so that the truck is free to follow the curve with least loss of power.

This invention relates particularly to improved means for correlating two or more subtrucks and which means also serve to return the trucks to a central position when the vehicle is running on a straight track. Furthermore, the invention provides improved means for suspending the truck from the axle boxes whereby greater efficiency is obtained with a minimum amount of friction.

The invention accordingly consists in the features of construction, combinations of elements and arrangements of parts which will be exemplified in the construction hereinafter set forth, and the scope of the application of which will be indicated in the following claims.

The accompanying drawings show one example of the apparatus by which this invention can be carried into effect.

Figure 1 is a view in plan.

Fig. 2 is a view in end elevation.

Fig. 3 is a view in side elevation showing how the main truck is suspended from the axle boxes.

Fig. 4 is an underside plan corresponding to Fig. 3.

Fig. 5 is a view in section on line $x$—$x$ of Fig. 3.

Fig. 6 is a sectional plan on the line $y$—$y$ of Fig. 3.

In the apparatus shown in the drawings the improved construction consists of a main truck structure supporting the car body, this truck structure comprising side frames $a$ and cross members $a'$ uniting the frames together. With vehicles having a pair of axles the usual yokes $b$ are provided in the side frames $a$, at each end to receive the axle boxes $c$, the pedestals $b'$ of the yokes being far enough apart to permit longitudinal movement of the axle box $c$, thereby permitting the axle to turn. A member $d$ of the truck is carried beneath and parallel with the side frame $a$ under the yoke, which member $d$ is capable only of independent vertical movement relatively to the truck under control of springs $d'$. A link or hanger $e$ suspended from the axle box $c$ supports the said member $d$ and this member is preferably ⊓-shaped and both ends $e'$, $e'$ are pivotally connected to a stirrup $f$ which is capable of sliding longitudinally with respect to said suspended member $d$. The stirrup $f$ slides on anti-friction devices consisting of rollers $d^2$ carried within the suspended member $d$ which is hollow and slotted at both sides to receive the axles $d^3$ of the rollers $d^2$ having bearings in the sides of the stirrups. The suspended member $d$ is closed at the bottom so as to retain lubricant therein.

The suspended member $d$ above referred to is constructed in the arc of a circle struck approximately at a point about the center of the axle (see Fig. 4) and this curved member is concentric with a plate $g$ at the inner end of the subtruck frame $h$, which plate is connected by suitable rods and links to the brake operating mechanism.

With the improved structure a pair of axles $c'$, is employed and accordingly there are two subtrucks $h$ $h$ one at each end of the vehicle, and these two subtrucks are correlated as heretofore mentioned. The means for correlating the trucks consist of cables or chains $k$, with the provision of turnbuckles $k^3$ for taking up slack therein. These cables $k$ are connected to the inner end of a subtruck frame $h$ at each corner and then cross the structure diagonally and pass around a pulley $k'$ secured to the side frame $a$ or vehicle body at a point opposite the connection to the subtruck. From the pulley $k'$ the cable passes back to the same side where the cable is connected to the subtruck and here the cable is joined on to a spring $k^2$ fixed to the truck side frame $a$.

According to the above described arrangement when the forward truck reaches a curve and is caused to turn in accordance therewith, the strain of the spring $k^2$, which is normally under compression, is increased. The cable $k$ which connects the trailing truck passes around another pulley $k'$ at the same point as the other cable or chain and is connected to the same spring $k^2$, consequently this latter cable is slackened and this allows the wheels of the trailing truck to take a curve without its having to strain the spring. When the front wheel has traversed the curve and reaches the straight track the increased tension of the spring, caused in going around the curve, is sufficient to bring the front truck $h$ to its central or straight position, and the power of the spring is simultaneously exerted on the other cable so that the trailing subtruck $h$ is brought to the central position.

The connecting cables $k$ and pulleys $k'$ and arrangement of springs $k^2$ are duplicated for the other side of the subtrucks so that when a curve in the opposite direction is encountered these cable curves serve to correlate and control the subtrucks as above described.

The connections between the subtruck frames $h$ and the brake operating mechanism may with advantage take the form shown in Fig. 1, wherein to each of the curved plates $g$ is attached a rod $l$ having a roller $l'$ at one end engaging said plates. The other ends of the rods $l$ are connected in the manner shown by a flexible member which passes around pulleys carried by a cross member $m$, which member is adapted to be operated by the rods or cables $n$. Each member $g$ is attached to a lever $g'$ which is mounted on a shaft $g^2$ which shaft upon being rotated, operates a member $g^4$ through the medium of connecting rods $g^3$. The member $g^4$ carries the brake shoes $g^5$, and as will be seen from the drawing, the members $g$—$g^5$ are all supported by the subtruck frame $h$. This arrangement enables the subtrucks $h$ to turn as desired without interfering with the operation of the brake mechanism.

The connections between the subtruck frames $h$ and the main truck structure preferably take the form of plates or brackets $p$ attached to each frame $h$ at its inner end, and having a curved slot $p'$, the curve of which is struck from the middle of the axle $c'$, with each of which slots $p'$ engage a roller or pulley $r$ which is mounted in bearings carried by a transverse member $r'$ of the main truck frame. This arrangement enables the subtrucks $h$ to turn as desired and also serves to absorb the thrust from either axle.

What we claim and desire to secure by Letters Patent is:—

1. In a railway vehicle, the combination with a frame, of two radial trucks, centering means acting upon both trucks, and means whereby when one truck strains such centering means, the other is released from the control thereof.

2. In a railway vehicle, the combination with a frame, of two radial trucks, centering means containing a spring acting upon both trucks, and means for releasing one truck from the action of the spring when the other truck strains it.

3. In a railway vehicle, the combination with a frame and two radial trucks, of common centering means for the trucks, and means for releasing the trailing truck from the control of such centering means when the leading truck takes a curve.

4. In a railway vehicle, the combination with a frame and two radial trucks, of common centering means including a spring acting upon both the trucks, and means for releasing the trailing truck from the control of the spring when the leading truck takes a curve.

5. In a railway vehicle, the combination with a frame and two radial trucks, of common centering means for the trucks including a compression spring acting upon both trucks, and means for releasing the trailing truck from the control of the spring when the latter is compressed by the leading truck taking a curve.

6. In a railway vehicle, in combination, a frame, trucks adapted to turn relatively to said frame, means comprising springs arranged to maintain said trucks yieldingly in predetermined angular positions relative to said frame, and means whereby angular movement of one truck relieves the action of said spring means on another truck.

7. In a railway vehicle in combination, a frame, trucks adapted to turn relatively to said frame, means comprising springs arranged to maintain said trucks yieldingly in predetermined angular positions relative to said frame, and means whereby angular movement of one truck caused by rounding a curve stresses certain of said spring means so that a following truck may round the curve relieved of the action of the spring means stressed.

8. In a railway vehicle, in combination, a frame, a plurality of trucks associated therewith for angular movement with respect thereto, and means comprising connecting members extending from each of a pair of said trucks to the frame with common elastic means interposed tending to maintain a certain transverse angular relationship between said frame and said trucks and comprising devices whereby the angular movement of one of said trucks relatively to the frame automatically relieves the action of said elastic means upon another of said trucks.

9. In a railway vehicle, in combination, a frame, a pair of axle trucks resiliently supporting said frame and adapted to have relatively independent angular movement, and means comprising connecting elements extending from each of said trucks to the frame with a common spring interposed whereby a tendency is exerted to maintain each of said trucks in a certain transverse angular relationship with respect to said frame.

10. In a railway vehicle, in combination, a frame comprising arcuate side rail portions and having a spring and a pulley on each of two opposite sides thereof, a pair of trucks having anti-friction bearings whereby said trucks are coöperatively associated with the rail portions of said frame for relatively independent movement, connecting members extending diagonally from opposite corners at the rear of the forward truck over said pulleys and thence transversely to the springs on respectively opposite sides of said frame, and connecting members extending diagonally from opposite corners at the front of the rear truck over said pulleys and thence transversely to the springs in common with the first said connecting members.

In testimony whereof we have signed our names to this specification in the presence of two subscribing witnesses.

EDGAR PECKHAM.
SIDNEY THOMAS.

Witnesses:
ROBERT M. SPEARPOINT,
O. J. WORTH.

Copies of this patent may be obtained for five cents each, by addressing the "Commissioner of Patents, Washington, D. C."